United States Patent

Sato et al.

[11] Patent Number: 5,819,597
[45] Date of Patent: Oct. 13, 1998

[54] IN-CAR ROTATION DETECTING APPARATUS

[75] Inventors: Hiroyuki Sato; Yasuhiro Miyasaka; Hidetaka Numata; Tatsuya Yokoyama; Takashi Murakami, all of Miyagi-ken, Japan

[73] Assignee: Alps Electric Co., Ltd., Japan

[21] Appl. No.: 738,568

[22] Filed: Oct. 28, 1996

[30] Foreign Application Priority Data

Oct. 31, 1995 [JP] Japan ................................. 7-283635

[51] Int. Cl.⁶ ...................................................... G05G 1/10
[52] U.S. Cl. .......................... 74/553; 74/527; 200/11 A; 200/11 B; 116/315
[58] Field of Search ..................... 74/553, 527, 567–568; 200/11 A, 13, 14, 11 B, 11 C, 6 B; 116/315

[56] References Cited

U.S. PATENT DOCUMENTS

| | | | |
|---|---|---|---|
| 5,020,389 | 6/1991 | Sigler | 74/553 |
| 5,218,879 | 6/1993 | Lyons | 74/553 X |
| 5,271,293 | 12/1993 | Olsson et al. | 74/553 |
| 5,422,448 | 6/1995 | Nakano et al. | 200/11 |
| 5,487,316 | 1/1996 | Hornung et al. | 74/527 |
| 5,692,453 | 12/1997 | Vore et al. | 116/315 |

FOREIGN PATENT DOCUMENTS

57-76619  5/1982  Japan ........................................ 74/553

*Primary Examiner*—Vinh T. Luong
*Attorney, Agent, or Firm*—Brinks Hofer Gilson & Lione

[57] ABSTRACT

A rotation detecting device which issues a plurality of code signals by a simple configuration so as to detect the rotational angle position and the direction of rotation of a rotor according to the code signals. The rotation detecting device has a knob member which is rotatably attached to a part of an enclosure, a plurality of projections which are formed on the periphery of one end of the knob member, and two detection switches which selectively engage with the projections to turn ON/OFF and issue signals. These detection switches are disposed on a printed circuit board in such a manner that they turn ON/OFF at different timings as the knob member rotates. Thus, the rotational position and the direction of rotation of the knob member are detected by the combinations of the ON/OFF signals of the detection switches.

4 Claims, 8 Drawing Sheets

IN-CAR ROTATION DETECTING APPARATUS

BACKGROUND OF THE INVENTION

1. Field of the Invention

The present invention relates to an in-car rotation detecting device which issues a signal as a rotatably supported rotor rotates so as to detect the rotational angle or the direction of rotation of the rotor according to the signal and more particularly to an in-car rotation detecting device ideally suited for setting the volume of the air blow or the supply opening of an in-car air conditioner or the temperature in a car.

2. Description of Related Art

An air conditioner mounted in a vehicle such as a motorcar is equipped with many switches for controlling the operating conditions thereof, including the switches for turning ON/OFF an air conditioner and for adjusting the air blow supplied by an air conditioning fan, a switch for setting the temperature in the vehicle, and a switch for setting the direction of the air blow. These switches normally have knobs which are rotatably supported in the axial direction and which are turned to adjust the force or direction of air blow and temperature. In other words, the aforesaid switches may be referred to as rotation detecting devices for detecting the current angular positions and the directions of the respective knobs; based on the signals issued by these devices, the air conditioner is controlled or the direction of the air blow is set.

In addition to standard switches, code switches are also used for such a rotation detecting device. In a rotation detecting device which employs code switches, the code switches are mounted on a printed circuit board and a plurality of terminals of the code switches are inserted in through holes which are referred to as lands of the printed circuit board. In the code switches, rotors made integral with rotary shafts are provided with the patterns of Gray code wherein only one circuit is adapted to turn ON/OFF at a time so as to minimize the chance of erroneous outputs. A plurality of terminals and brushes are brought in contact through sliding motion; the brushes rotate around the rotary shafts of the rotors to slide on the code patterns.

Using such a rotation detecting device for controlling the aforesaid air conditioner would involve expensive code switches which have as many codes as the number of positions to be controlled. On the other hand, using general-purpose code switches which emphasize the standardization of components would be also expensive because the number of control positions would be inevitably great and unused codes would result.

As an alternative, a code pattern could be directly printed on a printed circuit board so that a slider moves on the pattern rather than using discrete code switches; however, there has been a durability problem in that extended use of the slider which moves on the pattern would wear the sliding surface and cause changes in resistance although the same function as that implemented by the aforesaid code switch may be provided. There is still another drawback in that dust would easily cause malfunction and the patterns are produced primarily by soldering silver on the circuit pattern on a printed circuit board, unavoidably leading to high cost.

SUMMARY OF THE INVENTION

Accordingly, it is a first object of the present invention to provide an inexpensive in-car rotation detecting device which is capable of accurately detecting the amount and direction of the rotation of a rotated member, i.e. knob, by a simple configuration and which permits compactness. Detecting the rotational position of the knob in a small scale requires only the number of means for detecting engaging sections be increased to increase the types of code signals to be issued; therefore, the detection accuracy can be enhanced very easily by setting the engaging sections and the means for detecting the engaging sections. Moreover, the in-car rotation detecting device does not require expensive code switches as in the conventional detection device described above, thus enabling lower manufacturing cost.

It is a second object of the present invention to provide an in-car rotation detecting device which is capable of accurately detecting a set rotational angle of the rotated member.

It is a third object of the present invention to provide an in-car rotation detecting device wherein at least two first engaging section detecting means are able to detect rotational position or the direction of rotation through either an outer knob member or an inner knob member, and at least three second engaging section detecting means are able to detect the absolute position of rotational angle through the other knob member. These first and second engaging section detecting means permit compactness of the whole device, thus leading to improved space factor.

It is a fourth object of the present invention to provide an in-car rotation detecting device which has a display unit integrally incorporated in a rotor to improve the space factor of a control panel and which also allows greater ease of operation.

The first object is implemented by a first means composed of a rotated member which is rotatably attached to a part of an enclosure, a plurality of engaging sections formed on the periphery of one end of the rotated member, and a plurality of engaging section detecting means which selectively engage with these engaging sections to turn ON/OFF and issue signals; wherein these engaging section detecting means are arranged so that they are turned ON/OFF at different timings by the rotation of the rotated member, and the amount and direction of the rotation of the rotated member are determined by the combinations of ON/OFF signals.

With the first means, the amount and direction of the rotation of the rotated member can be accurately detected by the simple configuration and the whole rotation detecting device can be made smaller. Detecting the rotational position of the rotated member in a small scale requires only the number of means for detecting engaging sections be increased to increase the types of code signals to be issued; therefore, the detection accuracy can be enhanced very easily by setting the engaging sections and the means for detecting the engaging sections. Moreover, the in-car rotation detecting device does not require expensive code switches as in the conventional detection device described above, thus enabling lower manufacturing cost.

The second object is accomplished by a second means composed of a rotated member which is rotatably attached to a part of an enclosure, a plurality of engaging sections formed on the periphery of one end of the rotated member, and at least three engaging section detecting means which selectively engage with these engaging sections to turn ON/OFF and issue signals; wherein these engaging section detecting means are arranged so that they are turned ON/OFF at different timings by the rotation of the rotated member, and the rotational angle position of the rotated member is determined by the combinations of ON/OFF signals.

In the second means, the set rotational angle position of the rotated member can be accurately detected since there are provided the rotated member which is rotatably attached to a part of the enclosure, the plurality of engaging sections formed on the periphery of one end of the rotated member, and at least three engaging section detecting means which selectively engage with these engaging sections to turn ON/OFF and issue signals; wherein these engaging section detecting means are arranged so that they are turned ON/OFF at different timings by the rotation of the rotated member, and the rotational angle position of the rotated member is determined by the combinations of ON/OFF signals.

The third object can be accomplished by a third means composed of an outer knob member which is rotatably attached to a part of an enclosure, an inner knob member which is rotatably fitted in the outer knob member, a plurality of first engaging sections formed on the periphery of one end of either the outer knob member or the inner knob member, at least two first engaging section detecting means which selectively engage with the first engaging sections to turn ON/OFF and issue signals, a plurality of second engaging sections formed on the periphery of one end of the other one of the outer knob member and the inner knob member, and at least three second engaging section detecting means which selectively engage with the second engaging sections and issue signals; wherein the plurality of the first engaging section detecting means are so arranged that they turn ON/OFF by the rotation of the corresponding one of the knob members at different timings and the amount and direction of rotation of one of the knob members are determined by the combinations of the ON/OFF signals, the plurality of the second engaging section detecting means are so arranged that they turn ON/OFF by the rotation of the corresponding other knob member at different timings and the rotational angle position of the other knob member is determined by the combinations of the ON/OFF signals.

With the third means, at least two first engaging section detecting means are able to detect the rotational position and the direction of rotation through, for example, the outer knob member and at least three second engaging section detecting means are able to detect the absolute position of rotational angle through the inner knob member. Thus, the first and second engaging section detecting means permit reduced size and improved space factor of the rotation detecting device.

The fourth object is accomplished by a fourth means which is equipped with a display unit inside the rotated member and a window for visually checking the display unit on the outer surface thereof in the aforesaid first means.

In the fourth means, the display unit for display is inserted in the rotated member, so that the state thereof can be seen while the rotated member is being turned. This enables operator to see the setting or the like of the rotated member while it is being operated, thus permitting improved space factor of the control panel and also greater ease of operation.

DESCRIPTION OF THE PREFERRED EMBODIMENT

The embodiments of the present invention will be described in conjunction with the accompanying drawings. Essentially like constituent elements are assigned like reference numerals throughout the embodiments and duplicate description thereof will be omitted.

Figure 1:
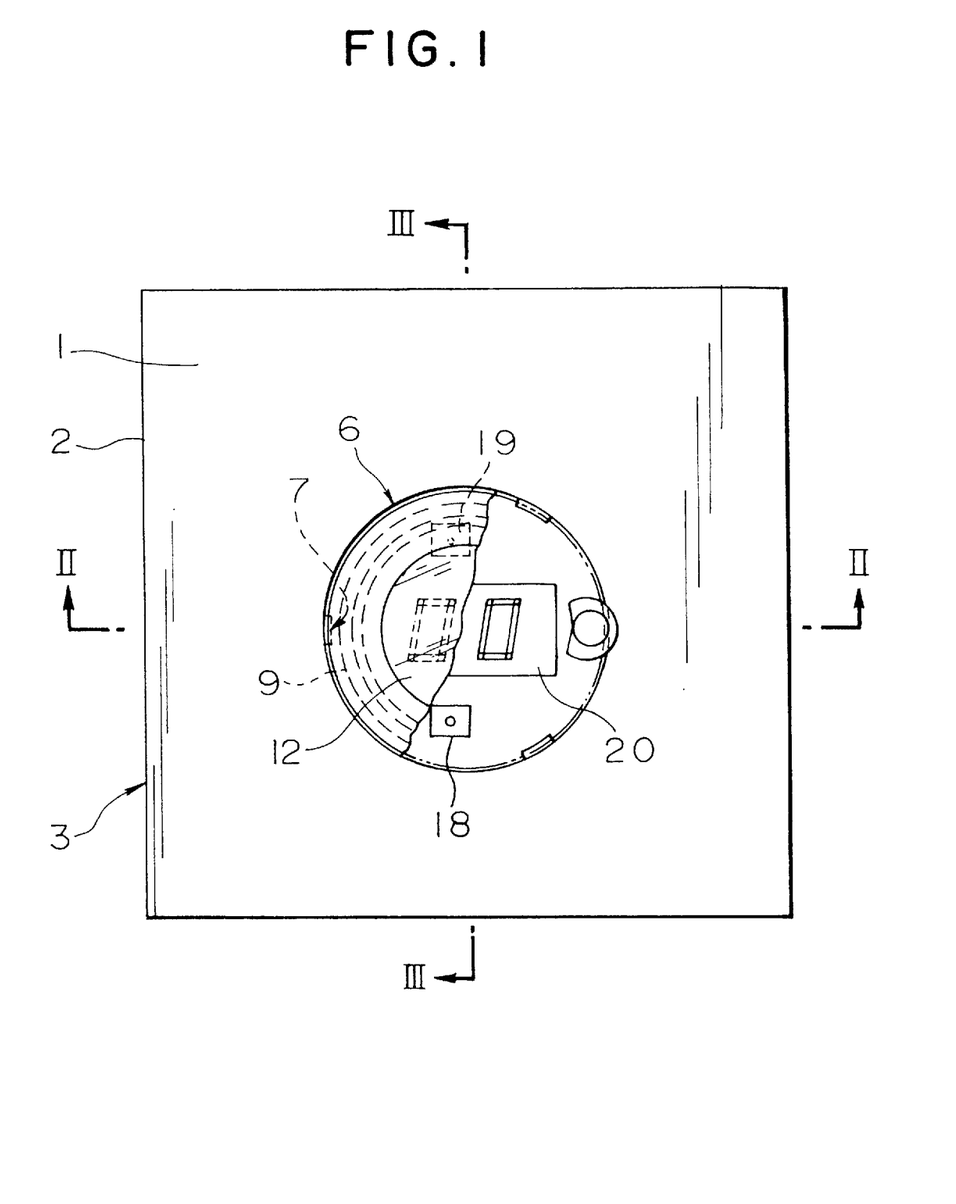
FIG. 1 is a front view of a first embodiment of the present invention, a part thereof being cut away.
Figure 2:
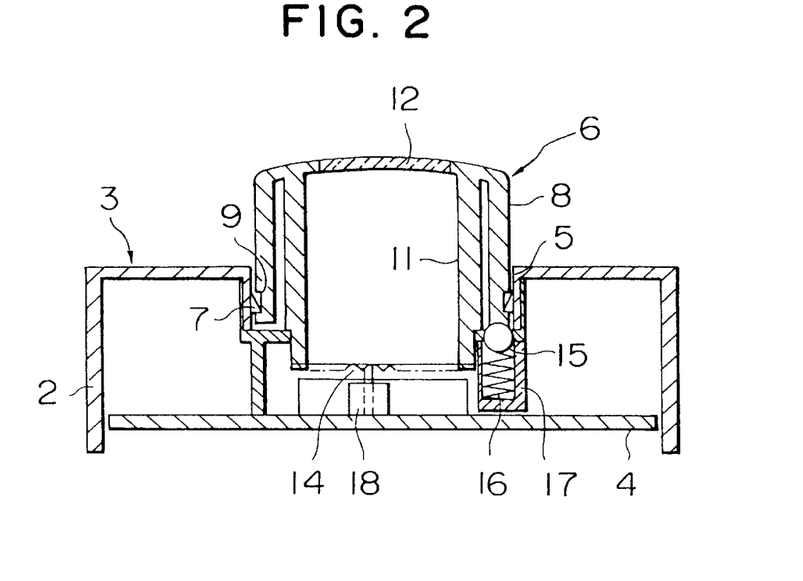
FIG. 2 is a longitudinal sectional view taken on line II—II shown in FIG. 1.
Figure 3:
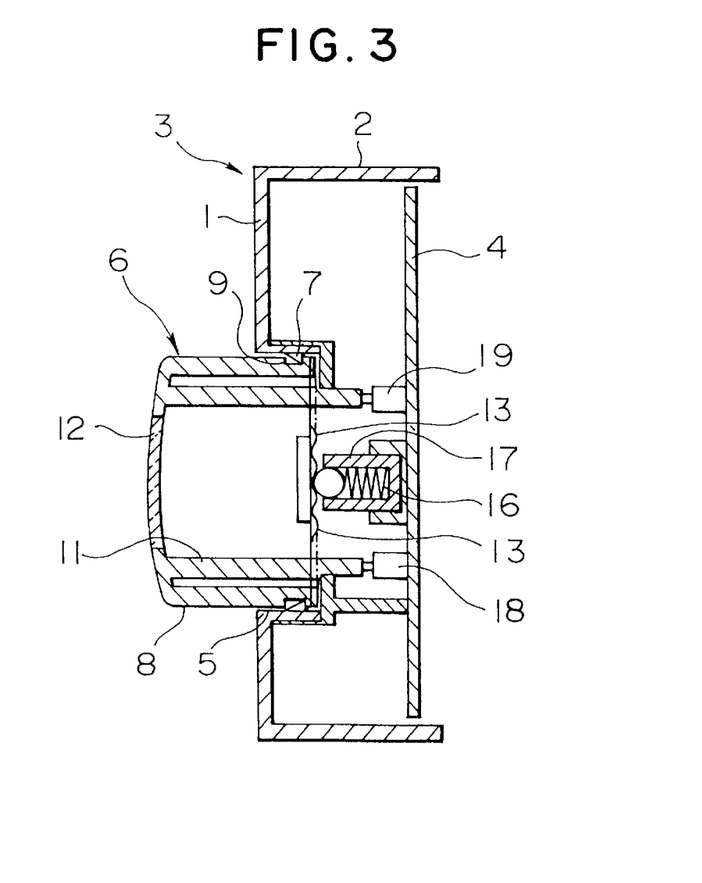
FIG. 3 is a longitudinal sectional view taken on line III—III shown in FIG. 1.
Figure 4:
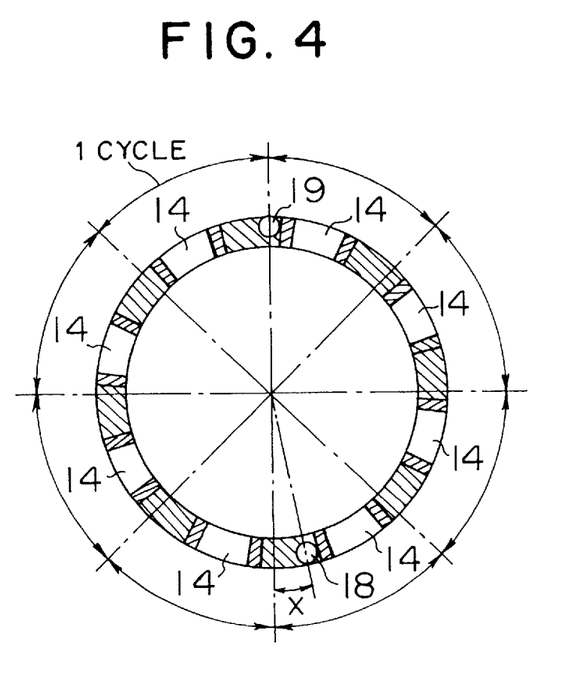
FIG. 4 is a front view illustrative of a schematic positional relationship between a knob member and detection switches in the first embodiment.
Figure 5:
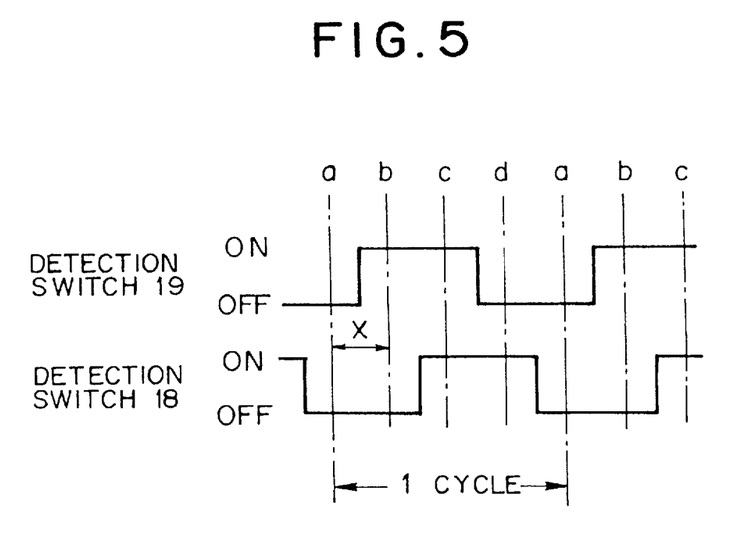
FIG. 5 shows a waveform illustrative of the operations of the detection switches in the first embodiment.
Figure 6:
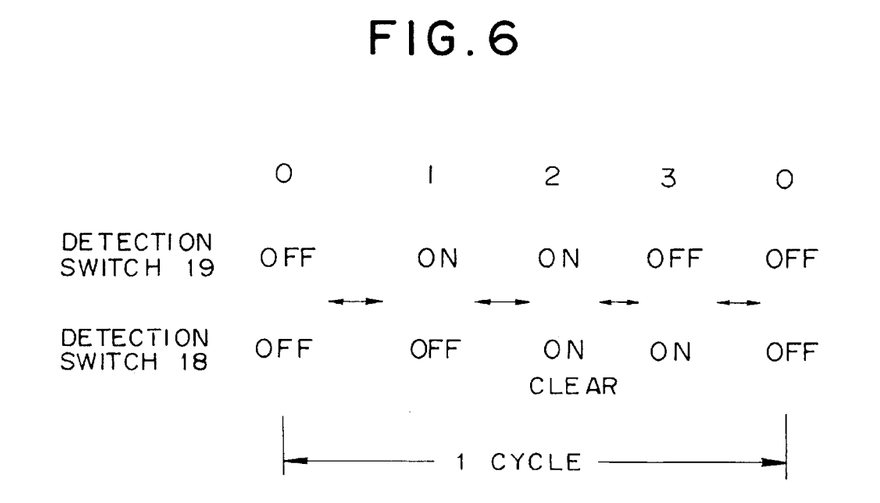
FIG. 6 is an explanatory diagram showing the operations of the detection switches in the first embodiment.
Figure 7:
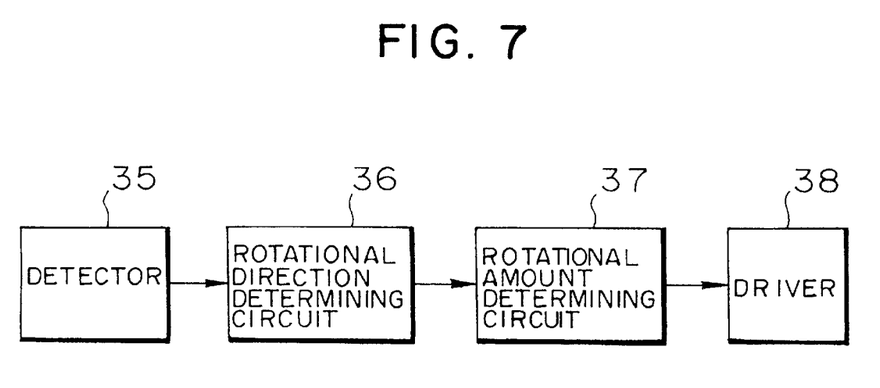
FIG. 7 is a circuit diagram illustrating a detector circuit in the first embodiment.

Referring to FIG. 1 through FIG. 7, a first embodiment adapted to detect relative positions will be described. FIG. 1 is a front view of the first embodiment, a part thereof being cut away; FIG. 2 is a longitudinal sectional view taken on line A—A shown in FIG. 1; FIG. 3 is a longitudinal sectional view taken on line B—B shown in FIG. 1; FIG. 4 is a front view illustrative of a schematic positional relationship between a knob member and detection switches in the first embodiment; FIG. 5 shows a waveform illustrative of the operations of the detection switches in the first embodiment; FIG. 6 is an explanatory diagram showing the operations of the detection switches in the first embodiment; and FIG. 7 is a circuit diagram illustrating a detector circuit in the first embodiment.

As shown in FIG. 1 through FIG. 3, the rotation detecting device has an enclosure 3 composed of a front panel 1 and a side panel 2, a printed circuit board 4 which is fitted to plug an opening of the rear surface of the enclosure 3, and an approximately cylindrical knob member 6 which is inserted in a cylindrical recess 5 formed nearly at the center of the front panel 1 of the enclosure 3.

The inner peripheral surface of the recess 5 of the enclosure 3 is provided with projections 7 in the circumferential direction. The projections 7 are loosely fitted in an annular groove 9 formed on an outer cylindrical section 8 of a knob member 6 when the knob member 6 is inserted in the recess 5, so that the knob member 6 is rotatably supported in the axial direction thereof and it does slip out of the recess 5.

The knob member 6 is composed of the aforesaid outer cylindrical section 8, an inner cylindrical section 11 which is located inside the outer cylindrical section 8 with a gap provided between them, and a front section 12 wherein at least a part thereof which covers the inner cylindrical section 11 is transparent. The front section 12 is shaped into a lens for enlarging the display unit which will be discussed later. A corrugated section 13 is continually formed over the full circumference on the end section located on the opposite side from the front section 12 of the outer cylindrical section 8. The end section located on the opposite side from the front section 12 of the inner cylindrical section 11 extends longer than the end section of the outer cylindrical section 8; formed equidistantly on the end peripheral section thereof are a plurality of projections 14.

A ball 15 is elastically pressed by a spring 16 so that it is in contact with a part of the projection 13 of the outer cylindrical section 8. The ball 15 and the spring 16 are contained in a housing 17 formed at the bottom of the recess 5. This structure enables the knob member 16 to rotate with clicks.

Projections 14 of the inner cylindrical section 11 engage with the operating projections of two pushed-to-drive detection switches 18 and 19, which are attached to the printed circuit board 4, so as to turn the switches ON or OFF.

As shown in FIG. 4, these two detection switches 18 and 19 are mounted on the printed circuit board 4 in such a manner that they are almost opposed to each other; they are shifted in position with respect to their associated projections 14 so that they are turned ON/OFF at different timings. To be more specific, the positional relationship between the two detection switches 18, 19 and the projections 14 is set to shift by X so as to provide four different operational statuses, namely, an operational status wherein both detection switches 18 and 19 are ON, an operational status wherein both detection switches 18 and 19 are OFF, an operational status wherein the detection switch 18 is ON while the detection switch 19 is OFF, and an operational status wherein the detection switch 18 is OFF while the detection switch 19 is ON. These operational statuses are illustrated in FIG. 5 and FIG. 6. A display unit 20 is attached to the transparent part associated with the front section 12 of the knob member 6 on the printed circuit board 4.

Figure 11:
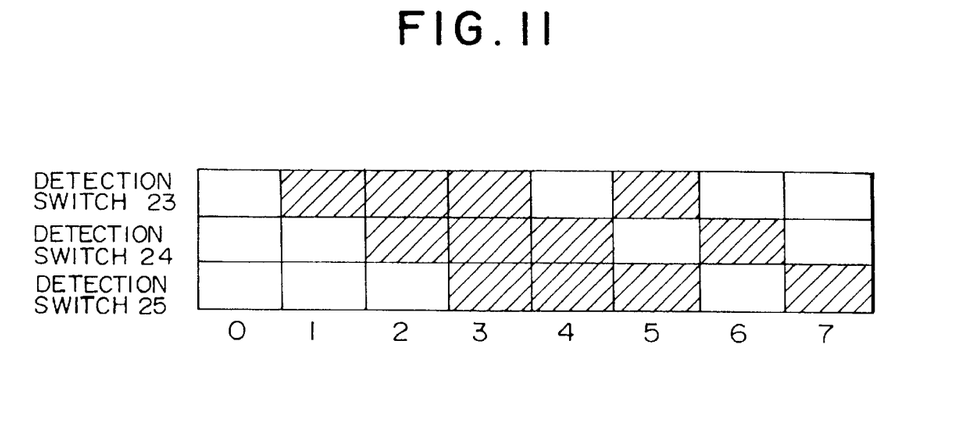
FIG. 11 is a diagram illustrating the operational statuses of the detection switches.

A signal detected by a detector 35 composed of the detection switches 18 and 19 is applied to a rotation direction determining circuit 36 to determine the direction of rotation of the knob. For instance, setting is made so that, when the knob is turned clockwise, the code signal changes from 0 to 1 and to 2 as illustrated in FIG. 6, and when the knob is turned counterclockwise, the code signal changes from 0 to 3 and to 2 as illustrated in FIG. 11. This makes it possible to determine the direction of the rotation by detecting the changes of the code signals. A rotation amount determining circuit 37 composed of a counter is connected to the output of the rotation direction determining circuit 36 to determine the amount of rotation of the knob. A driver 38 to which an output of the rotation amount determining circuit 37 is supplied drives a desired device in accordance with the determined direction of rotation and the determined amount of rotation.

In the first embodiment thus configured, by adjusting the amount of rotation of the knob member 6 through the clicking operation performed cooperatively by the projection 13 and the ball 15, the clicking operation of the knob member 6 produces the four different switch statuses after the detection switches 18 and 19 both start from the OFF (a) position as shown in FIG. 5 and FIG. 6, namely, a position "b" where the detection switch 18 is OFF while the detection switch 19 is ON, a position "c" where both detection switches 18 and 19 are ON, a position "d" where the detection switch 18 is ON while the detection switch 19 is OFF, and back to the position "a" where both detection switches 18 and 19 are OFF. Hence, based on the four different switches statuses, four digital codes as illustrated in FIG. 6 can be created. According to the digital codes, the direction of rotation, that is, whether the knob has been turned clockwise or counterclockwise, can be determined and further, the amount of rotation of the knob can be determined by counting the digital codes, thus detecting a relative position. This is usefully employed for such adjustment as temperature adjustment in the in-car air conditioner where fine adjustment of a set value is required. A set temperature can be indicated on the display unit in the knob member 6 and it can be checked while adjusting the temperature, thus permitting appreciably greater ease of operation and of visual check.

Figure 8A:
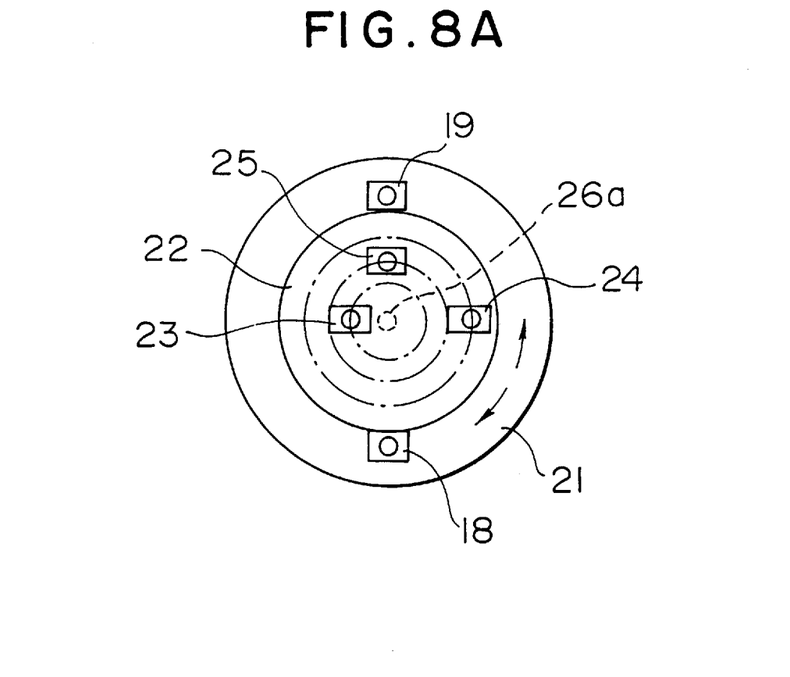
FIG. 8A is a conceptual diagram illustrative of a schematic positional relationship between the knob members and the detection switches in a second embodiment.
Figure 8B:
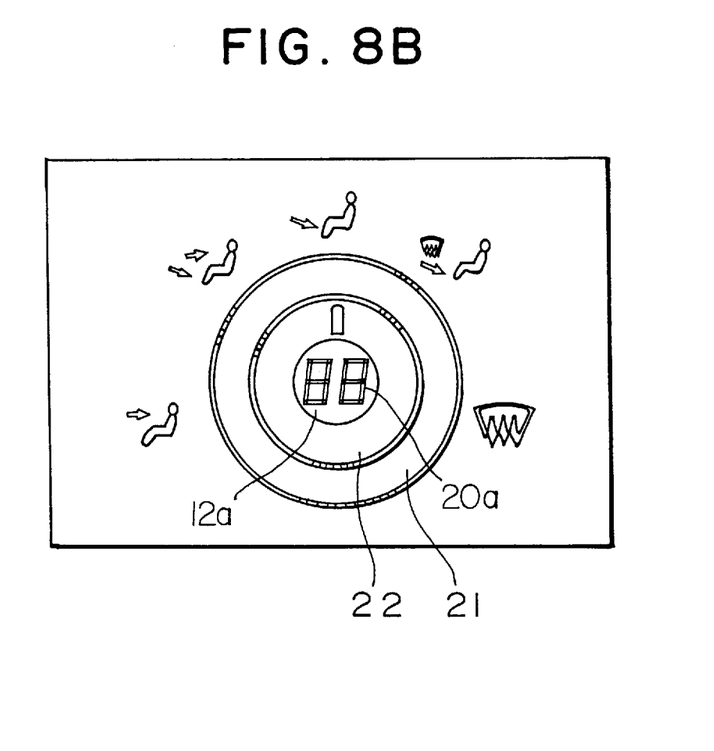
FIG. 8B is a front view of a control unit of an in-car air conditioner to which the second embodiment has been applied.

Referring now to FIG. 8A and FIG. 8B, a second embodiment which carries out the detection of relative positions and the detection of absolute positions will be described.

FIG. 8A is a conceptual view illustrative of a schematic positional relationship between the knob members and the detection switches in the second embodiment; and FIG. 8B is a front view illustrative of a console of an in-car air conditioner to which the second embodiment has been applied.

In the second embodiment, an outer knob member detects the relative position, while an inner knob member detects the absolute position.

Figure 10:
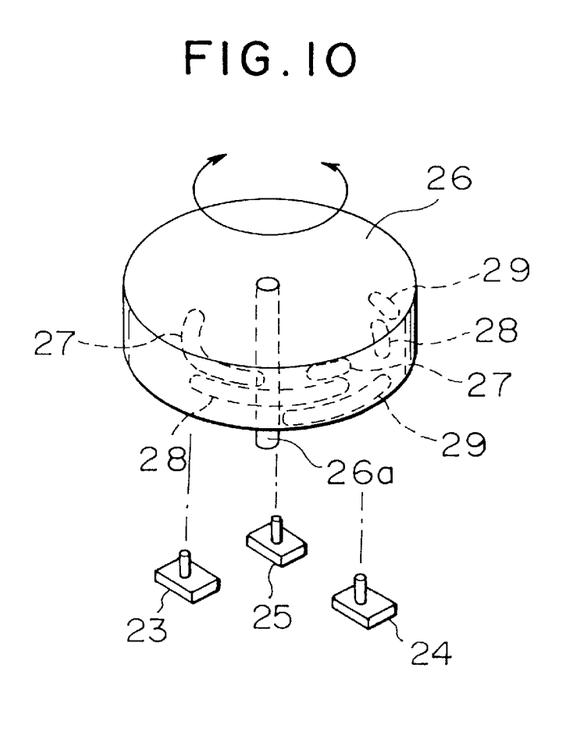
FIG. 10 is a schematic layout diagram illustrating the relationship between the inner knob member and the detection switches.

As shown in FIG. 8A and FIG. 8B, the knob assembly of this rotation detecting deice has an outer knob member 21 which is annularly provided on the outer side and an inner knob member 22 which is rotatably fitted in the outer knob member 21 independently of the outer knob member 21. The detection switches 18 and 19 are mounted on the printed circuit board 4 opposed to the outer knob member 21; provided on the printed circuit board 4 opposed to the inner knob member 22 are three detection switches 23, 24, and 25 at predetermined angular intervals with respect to the direction of rotation of the inner knob member 22 as shown in FIG. 10.

More specifically, the inner knob member 22 is mounted to a disc-shaped cam plate 26 which is rotatably supported on the printed circuit board 4. Provided on the rear surface of the cam plate 26 are three cam projections 27, 28, and 29 which selectively engage with the operating projections of the three detection switches 23, 24, and 25 as the cam plate 26 rotates so as to turn the switches ON/OFF. These cam projections 27, 28, and 29 are arranged so that they may be set in a total of eight different positions by adjusting the rotational angle of the cam plate 26, namely, a position where none of them engage with the operating projections of the detection switches 23, 24, and 25, three positions where they engage with each of the operating projections of the detection switches 23, 24 and 25, three positions where they engage with two operating projections of the detection switches 23, 24, and 25, and a position where they engage with all the operating projections of the detection switches 23, 24, and 25. As illustrated in FIG. 11, these eight different positions can be represented by the eight different code signals. The hatches areas in FIG. 11 denote that the switches are ON.

Figure 12:
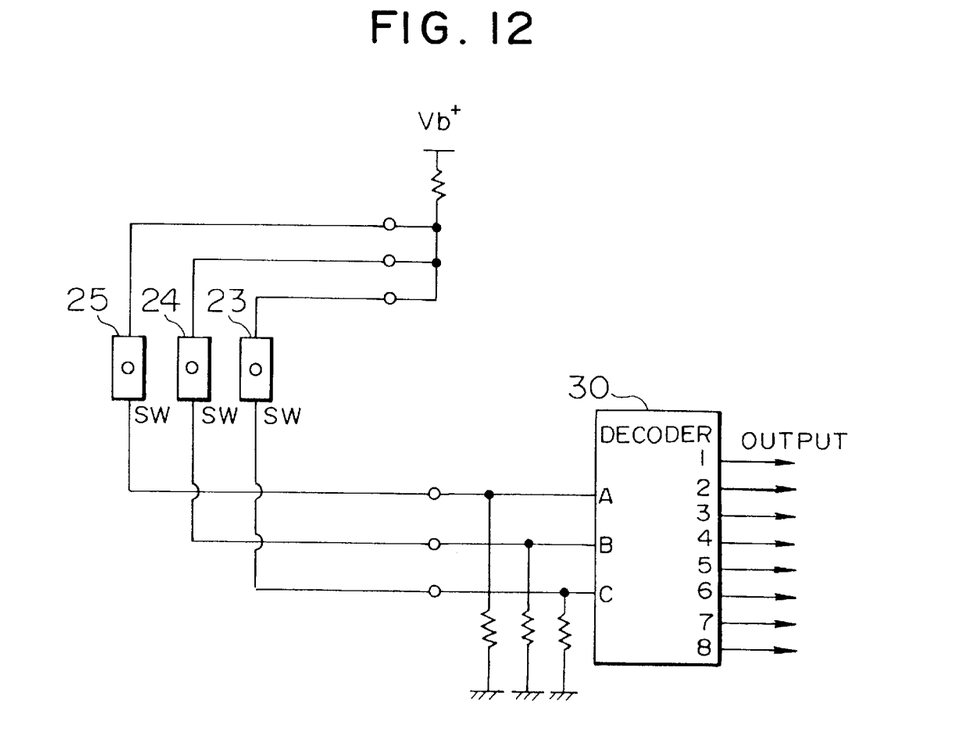
FIG. 12 is a circuit diagram for creating eight digital codes from the operational statuses of the detection switches.

The circuit diagram shown in FIG. 12 can be employed to create the eight digital codes based on the eight different operational statuses of the detection switches 23, 24, and 25. More specifically, the detection switches 23, 24, and 25 are connected to the three input terminals of a decoder 30 which outputs eight different digital codes according to a preestablished table shown in FIG. 11. These code signals are used to determine the rotational angle position of the inner knob member 22. For instance, setting is made so that, when the inner knob member 22 is turned clockwise, the code signal changes from 0 to 1 and to 2 as illustrated in FIG. 11, and when the inner knob member 22 is turned counterclockwise, the code signal changes from 0 to 7 and to 6 as illustrated in FIG. 11. This makes it possible to determine the rotational angle position by detecting the changes of the code signals. More specifically, the rotation range of the inner knob member 22 is divided into eight segments so that: all the detection switches 23, 24, and 25 turn OFF when the point reaches the start point of the rotating range and the digital code denoting "0" in FIG. 11 is issued; and the detection switch 25 turns ON, while the detections switches 23 and 24 turn OFF when the point reaches the end point of the rotation range and the digital code denoting "7" in FIG. 11 is issued. Further, the rotation range is divided equidistantly so that: the digital code representing "1" in FIG. 11 is issued when the detection switches 24 and 25 are OFF while the detection switch 23 is ON; the digital code representing "2" in FIG. 11 is issued when the detection switch 25 is OFF while the detection switches 23 and 24 are ON; the digital code representing "3" in FIG. 11 is issued when the detection switches 23, 24, and 25 are ON; the digital code representing "4" in FIG. 11 is issued when the detection switch 23 is OFF while the detection switches 24 and 25 are ON; the digital code representing "5" in FIG. 11 is issued when the detection switch 24 is OFF while the detection switches 23 and 25 are ON; and the digital code denoting "6" in FIG. 11 is issued when the detection switches 23 and 25 are OFF while the detection switch 24 is ON. By reading these digital code signals, it can be easily determined which position, i.e. blow mode, the inner knob member 22 has been set for as illustrated in FIG. 8B. To provide the inner knob member 22 with the display unit as described in the first embodiment, the central portion of the cam plate 26 and the inner knob member 22 are composed of a transparent material so that the readings on the display unit provided on the printed circuit board 4 may be seen through.

According to the configuration of the second embodiment described above, as illustrated in FIG. 8B, when the inner knob member 22 is turned to align the pointer provided on the surface thereof with a blow mode mark given around the outer knob member 21, the three detection switches 23, 24, and 25 issue the digital codes in the manners described above to detect the rotational angle position of the inner knob member 22 and the blow mode which corresponds to that particular blow mode is implemented. When the outer knob member 21 is turned, the two detection switches 18 and 19 issue the digital codes in the manners described above so as to change the set room temperature in accordance with the direction and amount of rotation. The newly set temperature is indicated on the display unit 20a which can be seen through the window 12a provided at the center of the inner knob member 22.

In the embodiment illustrated in FIG. 8B, the inner knob member is used for setting the mode of air blow of the in-car air conditioner and the outer knob member is used for setting the temperature inside the car; however, the application is not restricted to the embodiment and either the inner knob member or the outer knob member may be employed, for example, for setting the volume of air blow.

In the second embodiment, the two knob members for detecting relative positions and absolute positions, respectively, are provided coaxially. When providing only the knob member for detecting absolute positions, however, a third embodiment shown in FIG. 9 through FIG. 13 may be applied. The third embodiment for detecting absolute positions will now be described.

Figure 9:
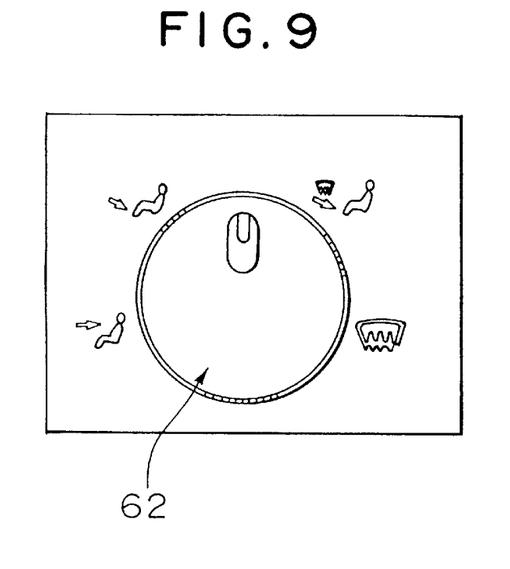
FIG. 9 is a front view of a control unit of an in-car air conditioner to which a third embodiment of the present invention has been applied.
Figure 13:
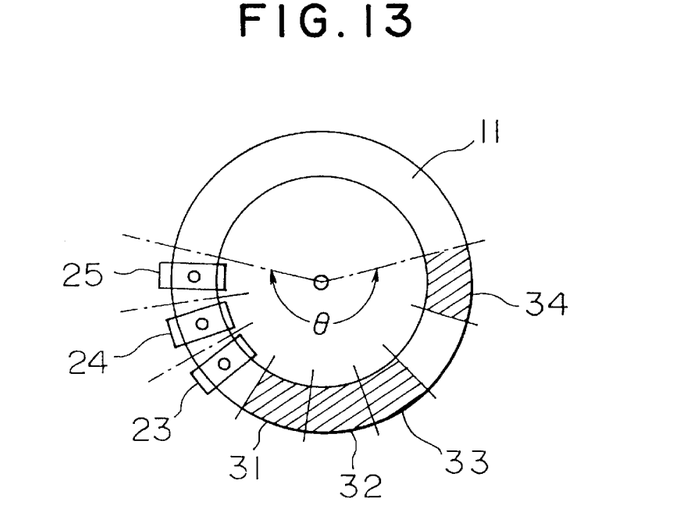
FIG. 13 is a diagram illustrating the relationship between the knob members and the detection switches in the third embodiment of the present invention.

FIG. 9 is a front view of a control unit of an in-car air conditioner to which the third embodiment of the present invention has been applied; FIG. 10 is a schematic layout diagram illustrating the relationship between the inner knob member and the detection switches; FIG. 11 is a diagram illustrating the operational statuses of the detection switches; FIG. 12 is a circuit diagram for creating eight digital codes from the operational statuses of the detection switches; and FIG. 13 is a diagram illustrating the relationship between the knob member and the detection switches in the third embodiment of the present invention.

The rotation detecting device is used, for example, for the control unit of an in-car air conditioner shown in FIG. 9. The rotation detecting device is applied to a blow control knob 62.

Specifically, the knob member 62 replaces the knob member 6 in the first embodiment; the three detection switches 23, 24, and 25 are annularly disposed on the printed circuit board 4 such that they are opposed to the end section of the inner cylindrical section 11. Provided on the end section of the inner cylindrical section 11 of the knob member 6 are three projections 31, 32, and 33 for pressing simultaneously the projections of the three detection switches 23, 24, and 25, and also a projection 34 formed with a gap which is equivalent to one detection switch and which is indicated by a blank in the drawing. This enables eight different digital codes shown in FIG. 11 to be issued. These detection switches and 23, 24, and 25, and the projections 31, 32, 33, 34, etc. are disposed by dividing the rotation range θ of the knob member 6 into eight segments. This means that each of the aforesaid intervals or the blank in the drawing corresponds to one eighth. Thus, the whole detecting device can be made smaller. The status shown in FIG. 13 corresponds to the digital code "0" shown in FIG. 11.

Figure 14:
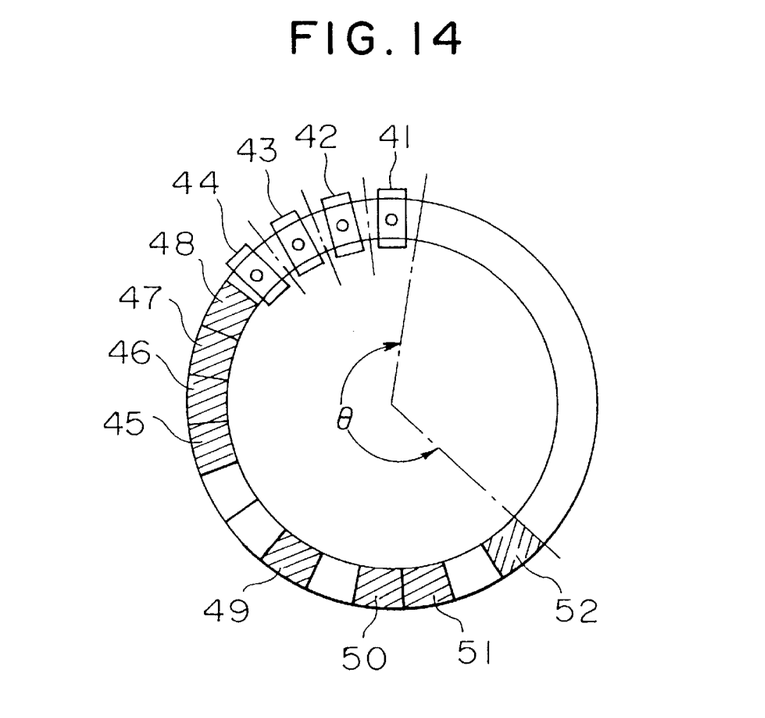
FIG. 14 is a diagram illustrating the relationship between the knob members and the detection switches in a modification example of the third embodiment of the present invention.

A modification example of the third embodiment illustrated in FIG. 14 is equipped with four detection switches to output sixteen different digital codes. FIG. 14 is a diagram for illustrating the relationship between the knob member and the detection switches in the modification example of the third embodiment.

Like the third embodiment described above, this modification example of the third embodiment has four detections switches 41, 32, 43, and 44 disposed annularly on the printed circuit board 4 opposing to the end section of the inner cylindrical section 11 of the knob member 6 of the first embodiment. Provided on the end section of the inner cylindrical section 11 are four projections 45, 46, 47, and 48 for pressing the four detection switches 41, 42, 43, and 44 at the same time, a single separate projection 49 which is disposed with a gap equivalent to two detection switches provided from the projection 48, two projections 50 and 51 which are formed with a gap equivalent to one detection switch provided from the projection 49, and a single separate projection 52 which is formed with a gap equivalent to one detection switch provided from the projection 49. These projections turn ON/OFF the four detection switches 41, 42, 43, and 44 so as to produce sixteen different digital codes. In this modification example, the rotation range θ of the knob member 6 is divided into sixteen segments.

This modification example has the same size as the third embodiment but it is capable of producing twice as many different digital codes, permitting more accurate adjustment.

It is obvious that in this modification example of the third embodiment, the decoder 30 shown in FIG. 12 may be replaced by one that has four input terminals and sixteen output terminals.

Thus, according to the first aspect of the present invention, the rotational position and the amount of rotation can be accurately detected by the simple configuration wherein the plurality of engaging sections are formed on the periphery on one end of the rotated member and the plurality of the engaging section detecting means are provided which selectively engage with the engaging sections. The rotation detecting device according to the first aspect of the invention can be manufacturer at lower cost since it has the simple structure, permits reduced size, and it can be configured without employing expensive code switches as in the conventional rotation detecting devices. Detecting the rotational position of the rotated member in a small scale requires only the number of means for detecting engaging sections be increased to increase the types of code signals to be issued; therefore, the detection accuracy can be enhanced very easily by setting the engaging sections and the means for detecting the engaging sections.

The rotation detecting device according to the second aspect of the present invention is equipped with the rotated member which is rotatably attached to a part of the enclosure, the plurality of engaging sections formed on the periphery of one end of the rotated member, and at least three engaging section detecting means which selectively engage with these engaging sections to turn ON/OFF and issue signals; wherein these engaging section detecting means are arranged so that they are turned ON/OFF at different timings by the rotation of the rotated member, and the rotational angle position of the rotated member is determined by the combinations of ON/OFF signals. This allows accurate detection of a set rotational angle of the rotated member.

In the rotation detecting device according to the third aspect of the present invention, at least two first engaging section detecting means are able to detect the rotational position and the direction of rotation through the outer knob member and at least three second engaging section detecting means are able to detect the absolute position of rotational angle through the inner knob member. Thus, the first and second engaging section detecting means enable reduced size and improved space factor of the rotation detecting device.

Further, the display unit is inserted in the rotated member, so that the state thereof can be seen while the rotated member is being turned. This enables operator to see the setting or the like of the rotated member while it is being operated, permitting improved space factor of the control panel and also greater ease of operation.

What is claimed is:

1. An in-car rotation detecting device comprising:
    a knob member which is rotatably attached to a part of an enclosure;
    a plurality of engaging sections formed on one end of said knob member; and
    a plurality of detecting switches with operating projections which selectively engage with said engaging sections to turn ON/OFF and issue signals;
    wherein said detecting switches with operating projections are arranged so that said detecting switches with operating projections are turned ON/OFF at different timings by the rotation of said knob member, and the amount and direction of the rotation of the knob member are determined by the combinations of ON/OFF signals.

2. An in-car rotation detecting device according to claim 1, wherein said knob member is provided with a display unit therein and a window for visually checking said display unit on the outer surface thereof.

3. An in-car rotation detecting device comprising:
    a knob member which is rotatably attached to a part of an enclosure;
    a plurality of engaging sections formed on one end of said knob member; and
    at least three detecting switches with operating projections which selectively engage with said engaging sections to turn ON/OFF and issue signals;
    wherein said detecting switches with operating projections are arranged so that said detecting switches with operating projections are turned ON/OFF at different timings by the rotation of said knob member, and the rotational angle position of said knob member is determined by the combinations of ON/OFF signals.

4. An in-car rotational detecting device comprising:
    an outer knob member which is rotatably attached to a part of an enclosure;
    an inner knob member which is rotatably fitted in said outer knob member;
    a plurality of first engaging sections formed on one end of either said outer knob member or said inner knob member;
    at least two first engaging section detecting means which selectively engage with said first engaging sections to turn ON/OFF and issue signals;
    a plurality of second engaging sections formed on one end of said outer knob member or said inner knob member free of said first engaging sections; and
    at least three second engaging section detecting means which selectively engage with said second engaging sections and issue signals;
    wherein said first engaging section detecting means are so arranged that said first engaging section detecting means turn ON/OFF by the rotation of the corresponding one of said knob members at different timings;
    the amount and direction of rotation of one of said knob members are determined by the combinations of the ON/OFF signals;
    said second engaging section detecting means are so arranged that said second engaging section detecting means turn ON/OFF by the rotation of the corresponding other knob member at different timings; and
    the rotational angle position of the other knob member is determined by the combinations of the ON/OFF signals.

* * * * *